Jan. 26, 1954     T. C. HARPER     2,667,369
FLEXIBLE FLUID-CONDUCTING CONNECTOR
Filed Aug. 20, 1949
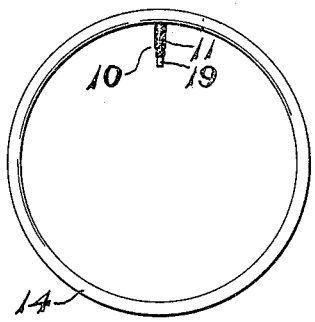
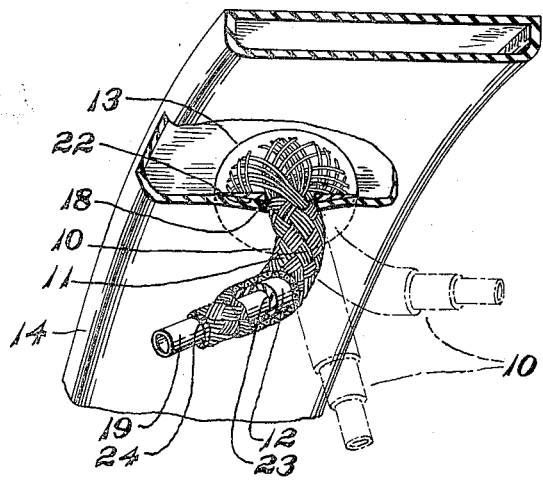
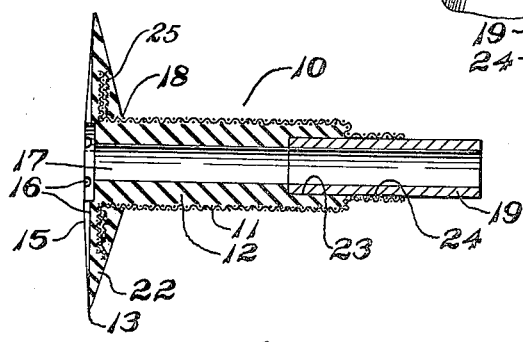
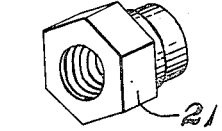
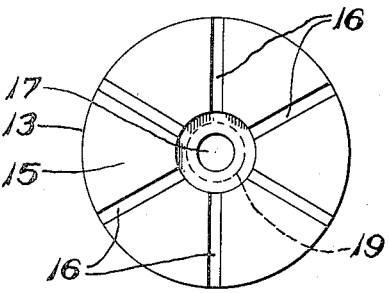
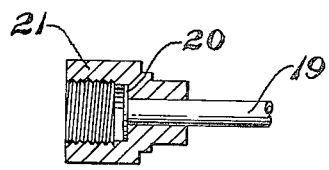
Inventor
Thomas C. Harper
By Dwight L. Moody
Att.

UNITED STATES PATENT OFFICE 2,667,369

FLEXIBLE FLUID-CONDUCTING CONNECTOR

Thomas C. Harper, Akron, Ohio, assignor to The B. F. Goodrich Company, New York, N. Y., a corporation of New York Application August 20, 1949, Serial No. 111,527

4 Claims. (Cl. 285—38)

The invention relates to flexible connectors for conducting fluid, suitable for mounting on fluid-containers.

Heretofore, fluid-conducting connectors used, for example, on the expansible brakes, and ice-removing inflatable shoes of aircraft have generally included stiff metal tubes for strength, which connectors because they have not been flexible, have lacked the ability to accommodate relative movement and misalignment of parts and have been subjected to heavy shearing stresses and sometimes torn loose. Fabric reinforcements of the connectors have not been fully satisfactory in those cases where considerable strength has been required, because where fabric in a sufficient number of plies to furnish the desired strength has been used, it has reduced the flexibility to an undesirable point.

An object of the invention is to provide for overcoming the foregoing difficulties and disadvantages of prior fluid-conducting connectors.

Another object is to provide an improved flexible connector satisfying the combined requirements of strength and flexibility, especially in the region of juncture of the stem with the base.

Further objects are to provide a flexible connector reinforced in the stem by metallic wire in flexible interlaced construction; to provide for the continuation of the wire in a spread interlaced condition in said region of juncture and in the base; and to provide for simplicity of construction, convenience of manufacture, and effectiveness of operation.

These and other objects and advantages will be apparent from the following description.

In the accompanying drawings which form a part of this specification and in which like numerals are employed to designate like parts throughout the same, Fig. 1 is a side elevational view showing a flexible, fluid-conducting connector mounted on an inflatable tube and constructed in accordance with and embodying the invention, Fig. 2 is an enlarged perspective view of the connector and tube, parts being broken away and in section, and broken lines showing the connector flexed to several alternative positions, Fig. 3 is a longitudinal sectional view of the connector before assembly with the tube, Fig. 4 is a bottom view of the base flange of the connector, Fig. 5 is a perspective view of a nut adapter fitting for the connector, and Fig. 6 is a longitudinal sectional view of the nut adapter fitting on an end element of the connector, parts being broken away.

The embodiment of the invention shown in the drawings includes a tubular flexible body 10 of the fluid-conducting connector having a plurality of strands of flexible metallic material such, for example, as steel or brass or aluminum wire, interlaced as by braiding in tubular form with each strand extending generally longitudinally and obliquely of the tubular body or helically about and along the tubular body and crossing over and under other strands obliquely back and forth circumferentially of the tubular body as shown especially in Fig. 2, to provide an outer covering 11 of flexible wire tubing effective to give good strength against burst and wear and to provide electrical shielding and at the same time give the desired flexibility to the connector. The body 10 includes a tubular flexible element 12 which may be in the form of an inner lining, of resilient rubber, natural or synthetic, or other rubber-like material, such as plasticized polyvinyl chloride, impervious to most liquids and gases and resistant to aging and to deterioration.

The connector has a base flange 13 of flexible material which desirably is a continuation of the rubber-like material of the inner lining 12 at one end for the attachment of the connector to a fluid-container such, for example, as an inflatable tube 14. The base flange may be tapered in cross-section radially toward its edge, as shown especially in Figs. 3 and 4, and may have in its bottom face 15 a plurality of circumferentially spaced-apart bleeder-channels 16 each extending radially outward in communication with a bore 17 of the body 10 for the purpose of preserving an open-passage between the container and the connector at all times.

The invention provides the desired reinforcement and flexing strength at the region of juncture at 18 of the body 10 and the flange 13 by continuing the strands of the braided wire tubing so that they extend radially outward from the body into the flange 13 in interlaced spread or diverging condition, and by anchoring the strands while maintained in their interlaced spread condition to the flexible rubber-like material of the flange 13, as shown especially in Fig. 2. An annular reinforcement 25 of textile fabric material, preferably coated on both sides with rubber-like material, may overlie the spread strands and extend radially beyond their ends to prevent the latter from extending to the upper surface of the flange. To this end, the braided wire tubing of the outer covering 11 at its end portion adjacent the flange 13 may be flared outwardly to produce the desired interlaced spread or diverging condition of the strands which may be embedded in the rubber-like material of the flange 13 intermediate the thickness of the same and underneath the fabric shield 25. The arrangement permits flexure and bending of the body 10 relative to the flange 13, and provides flexing strength at the juncture at 18 of the body and flange for resistance to torque and shear stresses imposed by the body on the base flange under service conditions.

The connector has at its other end a tubular element 19 of stiff material such, for example, as brass, steel, or aluminum tubing disposed in the bore 17 in sealing relation to the inner lining 12, which element 19 facilitates joining the connector to a fluid-conducting conduit (not shown). The element 19 may be adhesively bonded at 23 to the rubber-like material of the lining and may be secured as by brazing or soldering at 24 to the metallic wire strands of the outer covering 11 where they extend beyond the inner lining and partially overlap the element 19. The tubular element 19 is adapted to be fixedly and directly joined to the fluid-conducting conduit or it may receive a suitable inflating valve mechanism. Alternatively, the element 19 may have at its free end a flange 20, as shown especially in Fig. 6, for rotatably mounting a nut adapter fitting 21 for detachably joining the connector to the fluid-conducting conduit.

To make the connector, tubing of the rubber-like material in the uncured or the semi-cured condition and of suitable length is mounted on a mandrel and assembled with pieces of rubber-like material, the fabric reinforcement 25, and the braided wire tubing which is flared at one end and has the tubular element 19 secured to its opposite end. The assembled parts are then molded and vulcanized to the form shown in Figs. 2 and 3, whereby the rubber, fabric and metal materials are integrally bonded together. The mandrel is then removed from the connector.

The base flange 13 of the connector may be attached adhesively at its upper surface 22 to the wall of the tube 14 with the tubular flexible body 10 projecting through a suitable aperture in such wall, as shown especially in Figs. 1 and 2.

The connector described hereinabove, by virtue of its flexibility and its flexing strength at the hinging zone at 18, is suitable for use in installations generally, since the connector accommodates misalignment of adjacent parts of the assembly without subjecting the base flange 13 to undue shear stresses, and also permits bending the connector to fit the same into narrow spaces of the assembly.

The connector is advantageous for use on the expander tube of an expansible brake where flexibility of construction and flexing strength at the juncture at 18 are especially desirable to take care of misalignment of parts of the connection between the brake and the structure of the vehicle and to avoid objectionable shear stresses tending to loosen the connector from the expander tube.

Also, the connector is well suited for use on an ice-removing inflatable shoe for aircraft to avoid misalignment and cocking of parts of the connection to the shoe such as to cause an objectionable bump on the outside aerodynamic surface of the shoe.

Variations may be made without departing from the scope of the invention as it is defined in the following claims.

I claim:

1. A flexible fluid-conducting connector comprising a tubular element of flexible rubber-like material having an annular base flange of said material projecting radially outward from said element at one end thereof, a tubular reinforcing body extending along and exteriorly about said tubular element in snug fitting united relation thereto to resist radial stresses due to internal fluid-pressure within said tubular element, said reinforcing body comprising strands of flexible stretch-resisting filamentary material interlaced in braided tubular form with each strand extending generally helically about and along the longitudinal axis of said reinforcing body and crossing over and under other strands obliquely back and forth circumferentially of said reinforcing body so as to provide a seamless close meshed structure, substantially all the strands of said reinforcing body extending continuously across the junction of said tubular element and said base flange in slightly more open meshed, interlaced relation one to the other and then continuing radially outward from said junction into said base flange in increasingly more open meshed, interlaced relation one to the other to a position of substantially greater diameter than that of said reinforcing body and being anchored to said material of said base flange, flexing of said connector causing said reinforcing body to contract about said tubular element at said junction with a corresponding increase in resistance to flexing of said connector at said junction, and an open-ended hollow element united with both said tubular element and said reinforcing body at the other end of the connector for joining the latter to a fluid-conducting conduit.

2. A flexible fluid-conducting connector comprising a tubular element of resilient rubber-like material having an annular base flange of said material projecting radially outward from said element at one end thereof, a tubular reinforcing body substantially coextensive with and exteriorly about said tubular element in snug fitting bonded relation thereto to resist radial stresses due to internal fluid-pressure within said tubular element, said reinforcing body comprising strands of flexible stretch-resisting metallic filamentary material interlaced in braided tubular form with each metallic strand extending helically about and along the longitudinal axis of said reinforcing body and crossing over and under other strands obliquely back and forth circumferentially of said reinforcing body so as to provide a seamless close meshed structure, all the metallic strands of said reinforcing body extending continuously across the junction of said tubular element and said base flange in slightly more open meshed, interlaced relation one to the other and then continuing radially outward from said junction into said base flange in increasingly more open meshed, interlaced relation one to the other to a position of substantially greater diameter than that of said reinforcing body and being imbedded in and bonded to said rubber-like material of said base flange intermediate the thickness thereof, flexing of said connector causing said reinforcing body to contract about said tubular element at said junction with a corresponding increase in resistance to flexing of said connector at said junction, and an open-ended tubular member united sealingly with both said tubular element and said reinforcing body at the other end of the connector for joining the latter to a fluid-conducting conduit.

3. A flexible fluid-conducting connector comprising a tubular element having a continuous annular wall of impervious resilient rubber-like material and substantially uniform thickness and outside diameter and having a continuous annular base flange of said material projecting radially outward from said wall at one end of said element, a tubular reinforcing body coextensive with and exteriorly about said tubular element in snug fitting bonded relation to said wall to resist radial stresses due to internal fluid-pressure within said tubular element, said reinforcing body comprising strands of flexible stretch-resisting metallic wire arranged in bands interlaced in braided tubular form with each band of strands extending helically about and along the longitudinal axis of the tubular reinforcing body and crossing over and under other bands of strands obliquely back and forth circumferentially of said reinforcing body so as to provide a seamless close meshed structure, all said bands of strands of said reinforcing body extending continuously across the junction of said tubular element and said base flange in slightly more open meshed, interlaced relation one to the other and then continuing radially outward from said junction into said base flange in increasingly more open meshed, interlaced relation one to the other with individual strands thereof in diverging relation one to the other to a position of substantially greater diameter than that of said reinforcing body and being imbedded in and bonded to said material of said base flange intermediate the thickness thereof, flexing of said connector causing said reinforcing body to contract about said tubular element at said junction with a corresponding increase in resistance to flexing of said connector at said junction, and an open-ended tubular member of stiff metal material in the bore of said tubular element at the other end of the connector attached sealingly to both said tubular element and said reinforcing body for joining the connector to a fluid-conducting conduit.

4. A flexible fluid-conducting connector as defined in claim 3 in which said continuous annular base flange tapers in thickness to its outer periphery to provide an upper attaching surface of the flange facing toward the other end of the connector, and has a continuous annular reinforcement of woven textile fabric material overlying the bands of strands in said flange and adjacent said upper attaching surface thereof and extending radially to a position beyond the ends of said bands of strands.

THOMAS C. HARPER.

References Cited in the file of this patent

UNITED STATES PATENTS

| Number | Name | Date |
|---|---|---|
| 309,087 | Perry | Dec. 9, 1884 |
| 525,709 | Ives | Sept. 11, 1894 |
| 1,294,921 | Lewis | Feb. 18, 1919 |
| 1,662,605 | Hall | Mar. 13, 1928 |
| 1,804,294 | Watson | May 5, 1931 |
| 2,057,195 | Keefe | Oct. 13, 1936 |
| 2,189,987 | Kellems | Feb. 13, 1940 |
| 2,342,192 | Grigsby | Feb. 22, 1944 |

FOREIGN PATENTS

| Number | Country | Date |
|---|---|---|
| 324,139 | France | Dec. 2, 1902 |